(12) United States Patent
Verbowski

(10) Patent No.: US 11,351,832 B2
(45) Date of Patent: Jun. 7, 2022

(54) ADJUSTABLE RIDE HEIGHT SENSOR RELOCATION DEVICE AND A METHOD FOR ITS USE

(71) Applicant: Larry Verbowski, Bay City, MI (US)

(72) Inventor: Larry Verbowski, Bay City, MI (US)

( * ) Notice: Subject to any disclaimer, the term of this patent is extended or adjusted under 35 U.S.C. 154(b) by 0 days.

(21) Appl. No.: 16/810,975

(22) Filed: Mar. 6, 2020

(65) Prior Publication Data

US 2021/0276386 A1 Sep. 9, 2021

(51) Int. Cl.
*B60G 17/019* (2006.01)
*B60G 7/00* (2006.01)

(52) U.S. Cl.
CPC .......... *B60G 17/019* (2013.01); *B60G 7/001* (2013.01); *B60G 2204/1162* (2013.01); *B60G 2400/252* (2013.01); *B60G 2500/30* (2013.01)

(58) Field of Classification Search
CPC ................. B60G 17/019; B60G 7/001; B60G 2400/252; B60G 2204/1162; B60G 2500/30
USPC ....................................................... 280/5.514
See application file for complete search history.

(56) References Cited

U.S. PATENT DOCUMENTS

| | | | | |
|---|---|---|---|---|
| 5,046,754 A * | 9/1991 | Kimura | ................ | B60G 17/017 280/6.157 |
| 5,068,792 A * | 11/1991 | Lehr | .................. | B60G 17/0185 701/37 |
| 6,098,995 A * | 8/2000 | Danis | ................... | B60G 17/017 280/124.179 |
| 7,832,806 B2 * | 11/2010 | Yamada | ................ | B60N 2/682 297/440.15 |
| 8,746,714 B2 * | 6/2014 | Frens | ..................... | B60G 7/003 280/86.757 |
| 2004/0155509 A1 * | 8/2004 | Smith, Jr. | ................ | A47C 7/42 297/440.15 |
| 2006/0267296 A1 * | 11/2006 | Dodd | ............... | B60G 17/01908 280/5.512 |
| 2018/0251000 A1 * | 9/2018 | Norton | ..................... | G01B 7/14 |
| 2019/0039431 A1 * | 2/2019 | Vaughan | ............. | B60G 21/026 |
| 2020/0238782 A1 * | 7/2020 | Vaughan | ............ | B60G 17/0525 |

* cited by examiner

*Primary Examiner* — Toan C To

(57) ABSTRACT

An adjustable ride height sensor relocation device that comprises a single unitary cam shaped element and is incorporated into the suspension system of a vehicle to control ride quality of the vehicle. A suspension system in a vehicle containing such an adjustable ride height sensor relocation device and a method of restoring original automotive equipment parameters for a suspension system of a vehicle.

3 Claims, 10 Drawing Sheets

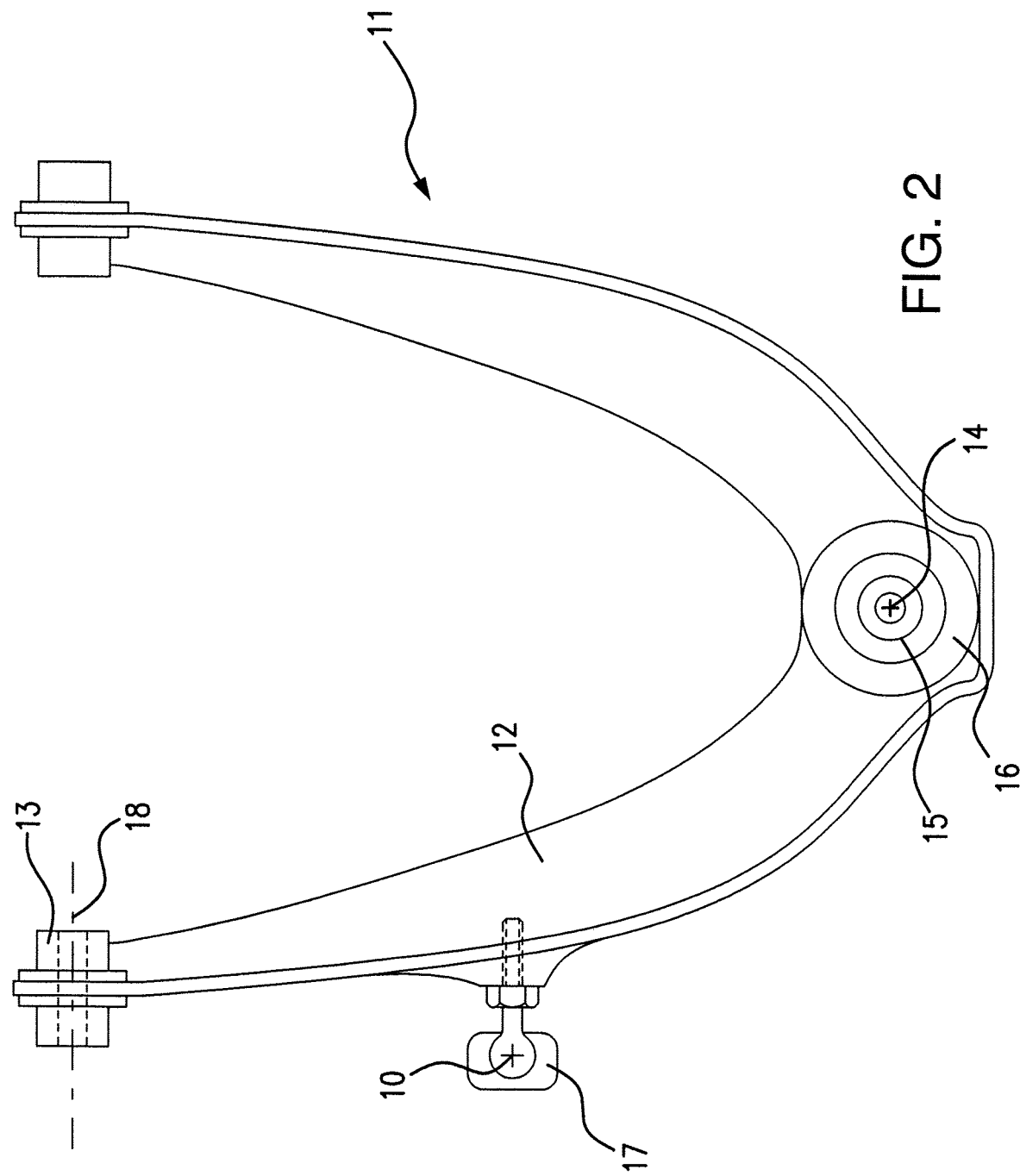

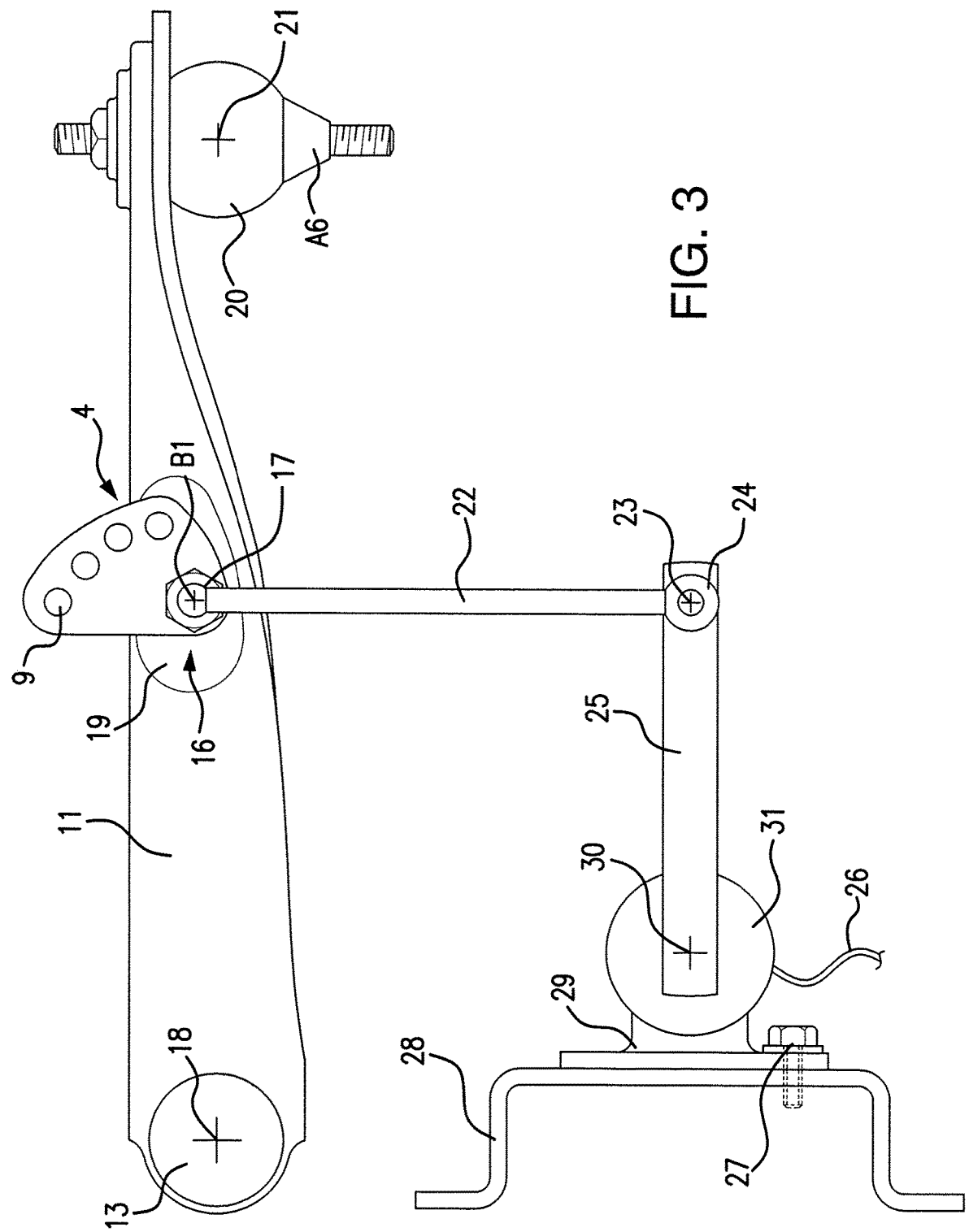

Suspension Sensor at a Predetermined Range (Curb Height Suspension at Rest on Level Surface)

X SV ——————————————————— Curb Height

Y Resistance ——————————————— Curb Height

FIG. 8

Changes to Curb Height = Changes Voltages/Resistance

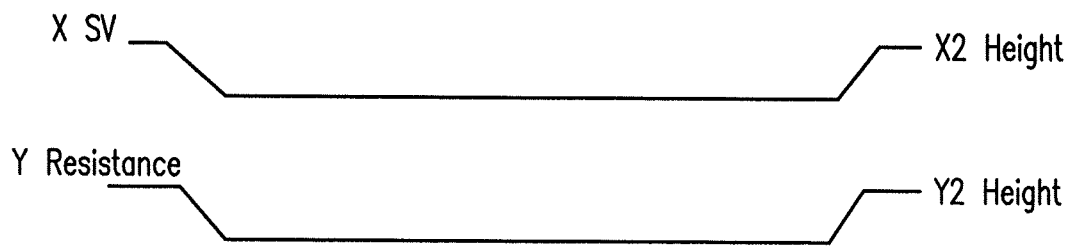

\* Out of Normal Range Sensors Command Shock Absorber System To Adjust out of Comfortable Range.
Acceptable Results: Extremly Hard Ride, Reducing Control and Causing Dangerous Driving Conditions.

FIG. 9

ADJUSTABLE RIDE HEIGHT SENSOR RELOCATION DEVICE AND A METHOD FOR ITS USE

BACKGROUND OF THE INVENTION

The applicant was unable to find any publications regarding the device of this invention, or similar devices. This device was invented to overcome a problem associated with automotive vehicles in which the vehicle has an automatic level adjusting device for maintaining the vehicle in a comfortable ride.

The device attaches to the front arm of a control arm component in the vehicle and connects to a suspension ride sensor which is common in today's automobiles.

THE INVENTION

Thus, what is disclosed in this specification and claims is an adjustable ride height sensor relocation device that comprises a single unitary metal cam shaped element, the element having a front and a back, and a first side and an intersecting second side.

There is a third side intersecting with said first side and said second side to form the cam shaped element.

There is a through opening from the front through the back at the intersection of the first side and the second side and, in addition, there is a plurality of threaded through openings aligned from the intersection of the second side and the third side to the intersection of the third side and the first side.

In another embodiment of the invention, there is an adjustable ride height assembly that comprises in combination a suspension control arm for a vehicle, an adjustable ride height sensor detachedly attached to the suspension control arm, a suspension ride sensor, and an actuator rod connected to the adjustable ride height sensor, wherein a suspension ride sensor lever arm connects the actuator rod to the suspension ride sensor.

In a further embodiment, there is a method of restoring original automotive equipment parameters for a suspension system of a vehicle. The method comprises detachedly attaching an adjustable ride height sensor relocation device described just Supra to a front arm of a control arm of a vehicle having adjustable ride control and attaching a sensor arm of the adjustable ride control to the adjustable ride height sensor relocation device in one of the plurality through holes, in a predetermined position.

BRIEF DESCRIPTION OF THE DRAWINGS

FIG. 2 is a top view of a suspension control arm of a vehicle with the device of FIG. 1A installed on a front of a front arm of the suspension control arm.

FIG. 3 is a full side view of a suspension control arm of a vehicle with device of FIG. 1A installed on a front of a front arm of the suspension control arm and showing an attached suspension ride sensor.

FIG. 8 shows graphic data lines of height for a suspension sensor at a predetermined range (curb height suspension at rest on a level surface) wherein X is 5 volts and Y is resistance.

FIG. 9 shows graphic data lines for height changes to curb height (changes voltages and resistance) for a suspension sensor wherein X is 5 v and X2 is curb height and Y is resistance and Y2 is curb height.

DETAILED DESCRIPTION OF THE DRAWINGS

This invention deals with strategic placement of suspension sensors actively monitoring ride height and wheel velocity movement in the vertical plane.

As a vehicle, so equipped, is driven, suspension ride height movement and variable change is measured by each pre-positioned sensor.

The sensor monitors are wired to a main vehicle body control module which is not part of this invention. Vehicle body control modules constantly calculate suspension ride height and wheel movement velocity and compare data to predetermined parameters. As the vehicle is driven, future, reactive, suspension dampeners are activated. As can be observed from the enclosed drawings, the typical suspension layout consists of upper and lower suspension control arms, struts, solid axle suspension and any combination of components comprising the suspension, such as magnetic ride control, adjustable ride control, ride adjustable dampening, active dampening systems and active suspension systems and any suspension system that adjusts ride firmness wherein shock absorber resistance continually adjusts (live adjustments), suspension sensors in one or more wheel positions, shock absorbers on one or more wheels and shock absorbers with electronic motors adjusting shock dampening automatically.

Figure 1A:
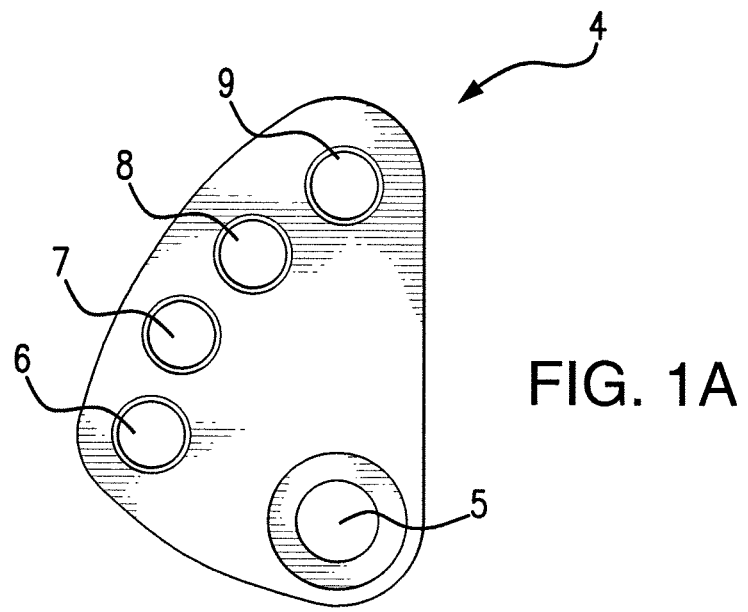
FIG. 1A is a full front view of a cam shaped adjustable ride height sensor relocation device of this invention.
Figure 1B:
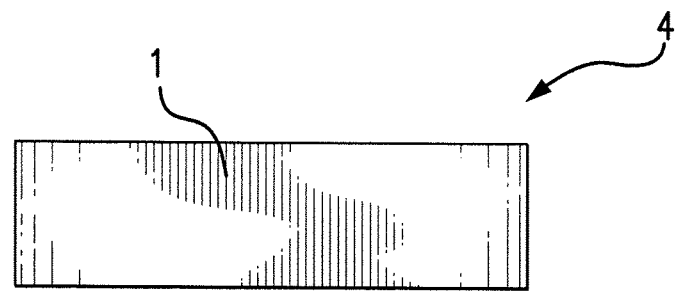
FIG. 1B is a full side view of one side of the cam shaped device of FIG. 1A.
Figure 1C:
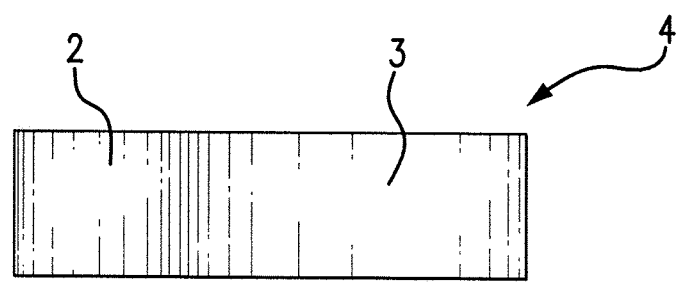
FIG. 1C is a full side view of the remaining two side of the device of FIG. 1A.

Turning now to the drawings, FIG. 1A shows a full front view of an adjustable ride height sensor relocation device 4 and FIGS. 1B and 1C show a first side 1, a second side 2, and a third side 3. In FIG. 1A, there is also shown a mounting fastener opening 5 which is a through hole. Preferred for this invention is a countersunk opening although non-countersunk opening will suffice in some situations. It is contemplated within the scope of this invention to mount the adjustable ride height sensor on any control arm of the vehicle.

Also shown is a curved alignment of through openings 6, 7, 8, and 9, which openings are used to set predetermined levels for the sensor activity. Shown are four such openings, but it is contemplated within the scope of this invention to have more than four or less than four such openings. For purposes of this invention, the adjustable ride height sensor relocation device 4 is manufactured from metal or plastic, and preferred metals are aluminum and stainless steel while the preferred plastics are crosslinked polyethylene and polyurethane. Shown in FIG. 4 is a mounting fastener 10 for fastening the sensor 4 to the front arm of a front suspension control arm, both shown in subsequent drawings.

Turning now to FIG. 2, there is shown a full to view of a suspension control arm 11 for a vehicle having a front control arm 12, a control arm bushing 13, a ball joint center line 14, a ball joint mounting stem 15, a control mounting boss 16, an actuator ball control arm location 17, and a control arm frame pivot point 18.

FIG. 3 is a full side view of FIG. 2 wherein like designations are like components and shown therein is the control arm bushing 13, control arm frame pivot point 18, suspension control arm 11, control arm mounting boss 16, ball joint 20, ball joint center line 21, actuator ball control arm location 17, actuator rod 22, sensor arm mounting location center point 23, actuator ball 24, lever arm 25, suspension ride sensor signal wire 26, suspension ride sensor 31, suspension ride sensor mounting fastener 27, vehicle frame member 28, suspension ride sensor mounting fixture bracket 29, and suspension lever arm pivot point center 30.

Figure 4:
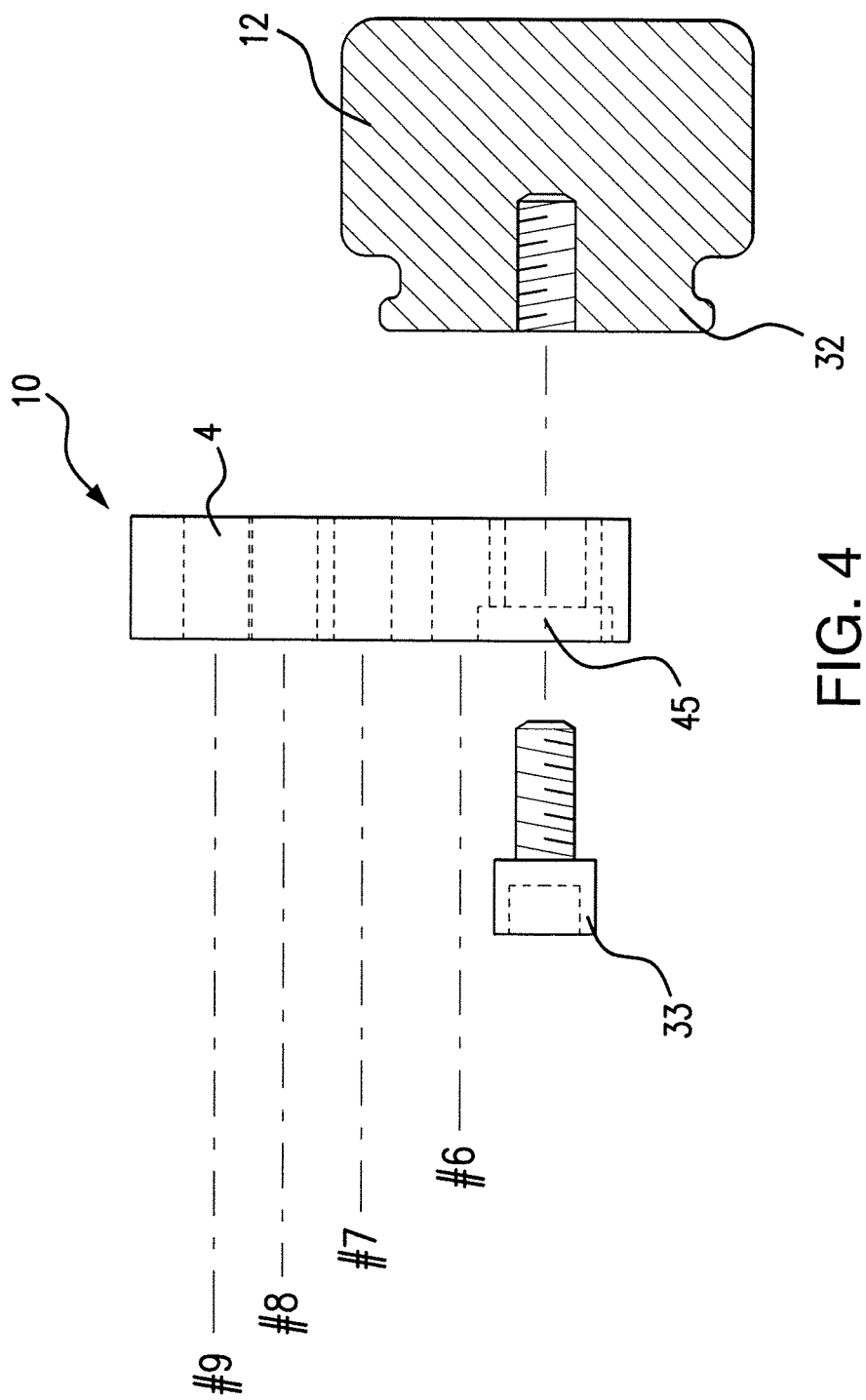
FIG. 4 is a full exploded side view of a sensor height cam of this invention.

A detailed drawing of the sensor height cam 4 is shown in FIG. 4 wherein there is shown the cam 4, suspension control arm 12 and control arm boss 32. In addition, there is shown the mounting fixture 33, cam pivot point mounting point (through opening 5) and the through holes 6, 7, 8, and 9.

Figure 5:
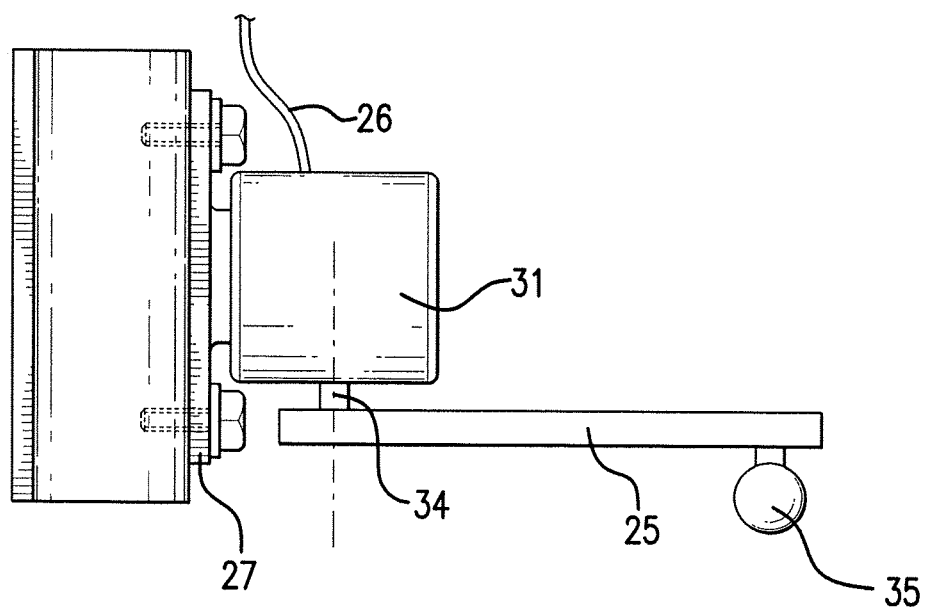
FIG. 5 is a full top view of a suspension ride sensor.

FIG. 5 is a full top view of the suspension ride sensor 31 showing a lever arm pivot point center 34, mounting fixture bracket 27, data signal wire 26, suspension ride sensor stud 35, and suspension ride sensor lever arm 25.

Figure 6:
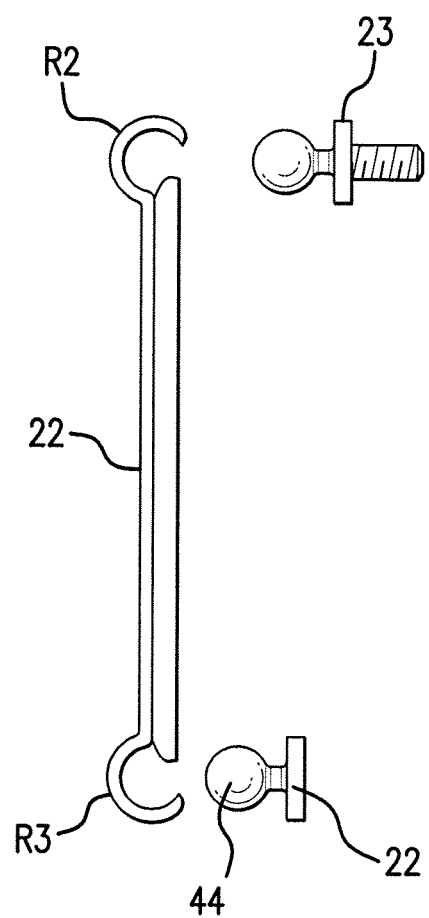
FIG. 6 is an enlarged view of an actuator rod for the suspension ride sensor of FIG. 5.

FIG. 6 is a full end view of the actuator rod 22 showing the control arm sensor, the sensor arm mounting location center point, the suspension ride sensor lever arm 22, the suspension ride sensor ball stud 44, the actuator ball, and the actuator rod 22.

Figure 7:
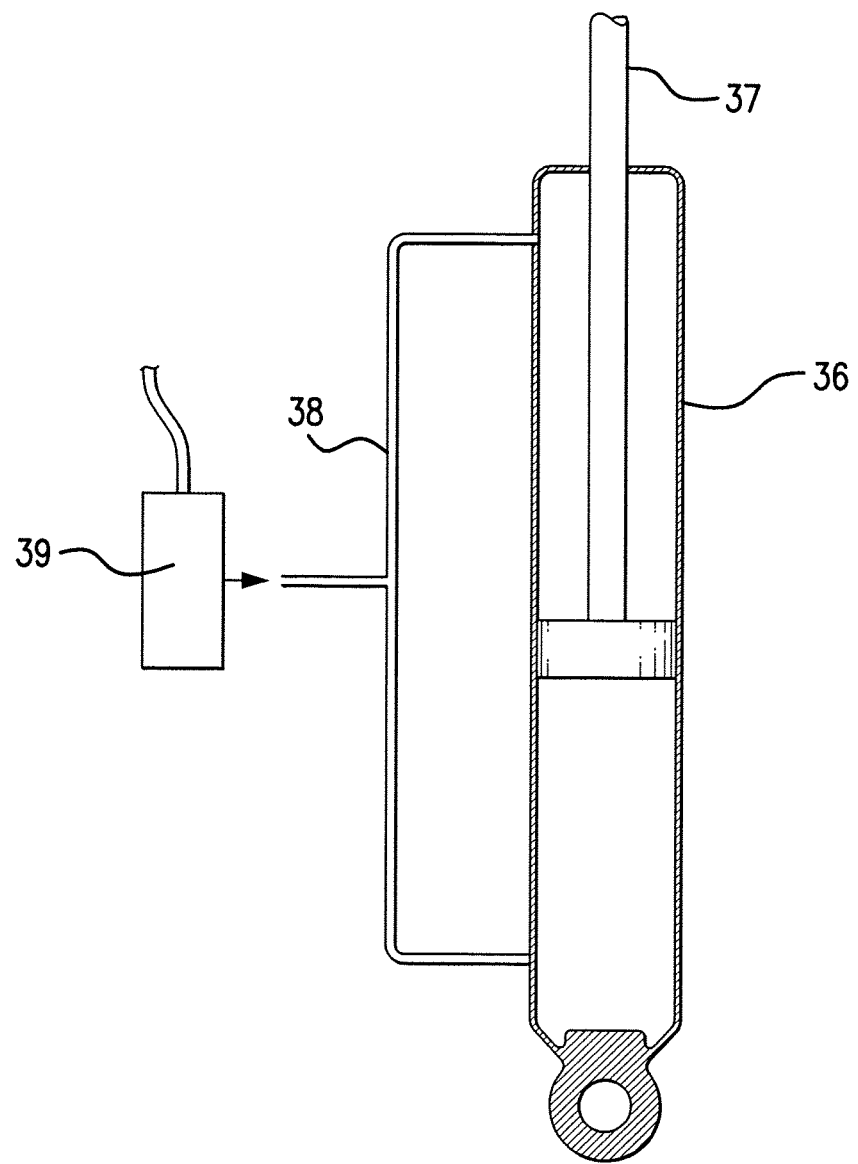
FIG. 7 is a full side view of a body disk-controlled system control module of a shock absorber for a vehicle.

FIG. 7 is a full side view of a body disk-controlled system control module of a shock absorber for a vehicle showing shock absorber 36, a rod 37 for the shock absorber 36, and a body control module adjuster 38 along with a motor 39 to drive the body control module adjuster 38. This assembly is part of the prior art and is included herein for a full understanding of the instant invention. The body control module commands shocks on the vehicle to adjust hard or soft based on digital data from the sensors of the assembly of this invention.

FIGS. 8 and 9 are graphics in comparison of the result of the invention herein, in that, FIG. 8 shows graphic data lines of height for a suspension sensor at a predetermined range (curb height suspension at rest on a level surface) wherein X is 5 volts and Y is resistance.

FIG. 9 shows graphic data lines for height changes to curb height (changes voltages and resistance) for a suspension sensor wherein X is 5 v and X2 is curb height and Y is resistance and Y2 is curb height.

Figure 10:
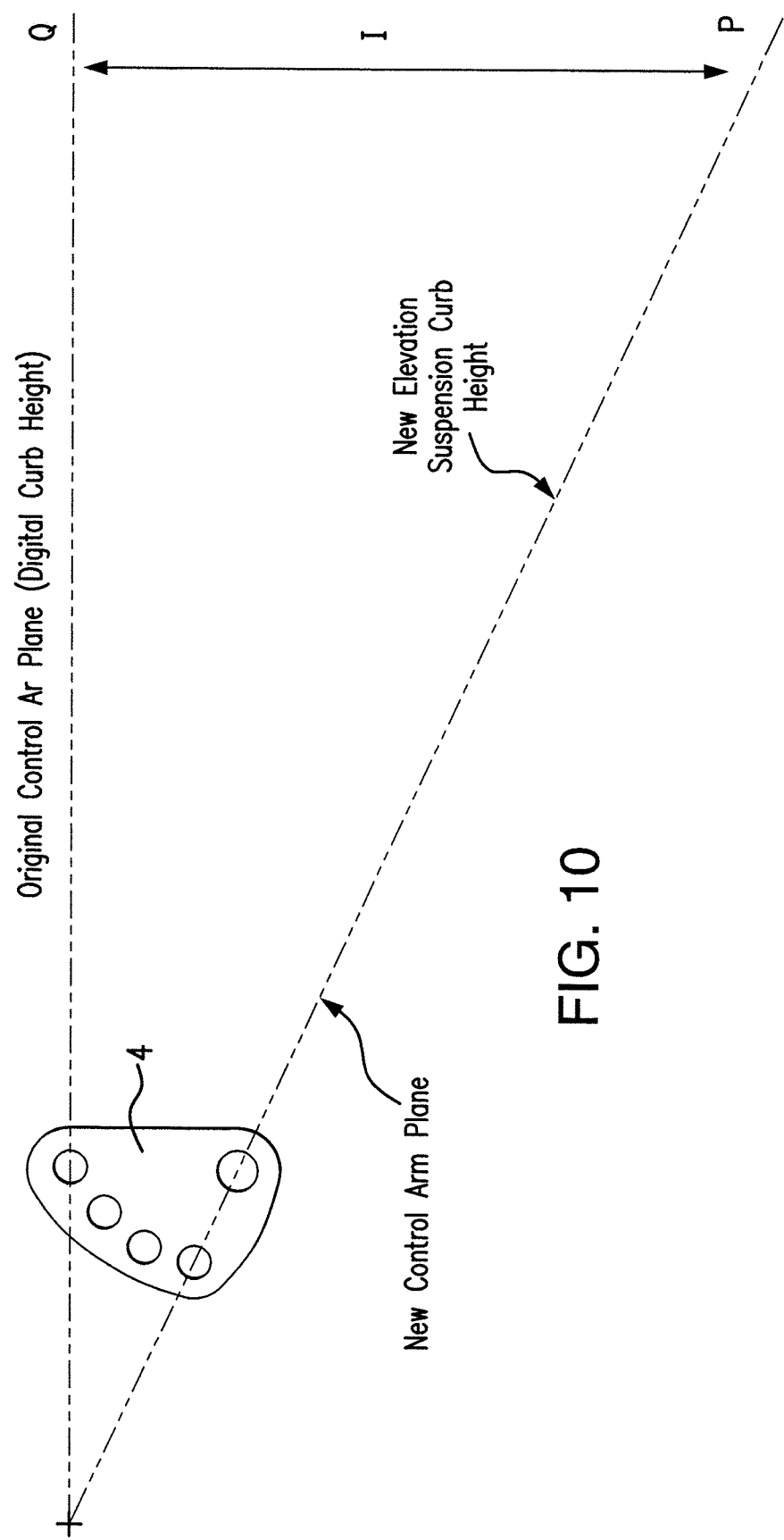
FIG. 10 shows the cam with a graphic line Q for original control arm plane (normal curb height) compared to a new control arm plane showing elevated suspension curb height P using the highest threaded through opening predetermined setting.

FIG. 10 shows the cam 4 with a graphic line Q for original control arm plane (normal curb height) compared to a new control arm plane showing elevated suspension curb height P using the first threaded through opening predetermined setting.

Figure 11:
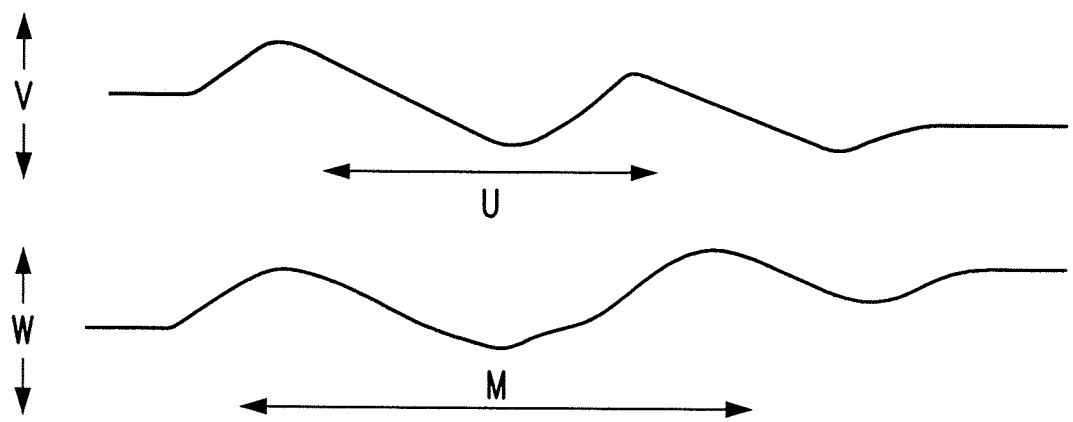
FIG. 11 is a schematic of the dynamics of operation of the device of this invention.

In FIG. 11, there is shown a schematic of the dynamics of operation of the adjustable ride height assembly using the adjustable ride height cam. V is the voltage reference and W is the resistance along the time lines U.

In another embodiment of this invention there is an adjustable ride height assembly comprising in combination a suspension control arm for a vehicle, an adjustable ride height sensor detachedly attached to the suspension control arm, a suspension ride sensor, an actuator rod connected to the adjustable ride height sensor, and a suspension ride sensor lever arm connecting the actuator rod to the suspension ride sensor.

In a further embodiment of this invention there is a method of restoring original automotive equipment parameters for a suspension system of a vehicle, the method comprising detachedly attaching an adjustable ride height sensor relocation device described just Supra to a front arm of a control arm of a vehicle having adjustable ride control and attaching a sensor arm of the adjustable ride control to the adjustable ride height sensor relocation device in one of the plurality through holes, in a predetermined position.

What is claimed:

1. An adjustable ride height sensor relocation device comprising:
   a single unitary cam-shaped element, said element having a front and a back;
   a first side and an intersecting second side;
   a third side intersecting with said first side and said second side to form said cam-shaped element;
   a through opening from said front through said back at said intersection of said first side and said second side and a plurality of threaded through openings aligned from said intersection of said second side and said third side to the said intersection of said third side and said first side.

2. An adjustable ride height sensor relocation device as claimed in claim 1 in combination with a mounting fastener to attach said adjustable ride height sensor relocation device to a control arm of a ride suspension of a vehicle.

3. A method of restoring original automotive equipment parameters for a suspension system of a vehicle, said method comprising:
   A.) detachedly attaching an adjustable ride height sensor relocation device of claim 1 to an arm of a control arm of a vehicle having adjustable ride control;
   B.) attaching a sensor arm of said adjustable ride control to said adjustable ride height sensor relocation device in one of said plurality through holes, in a predetermined position.

* * * * *